United States Patent Office 3,004,378
Patented Oct. 17, 1961

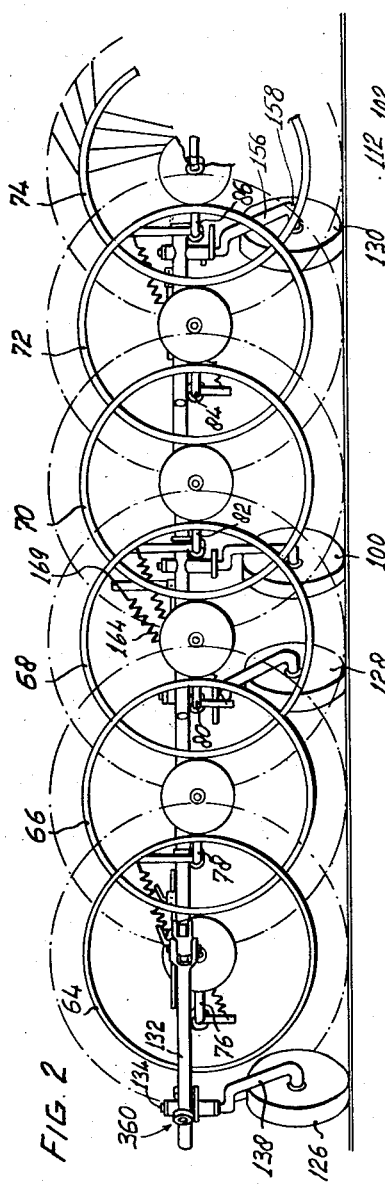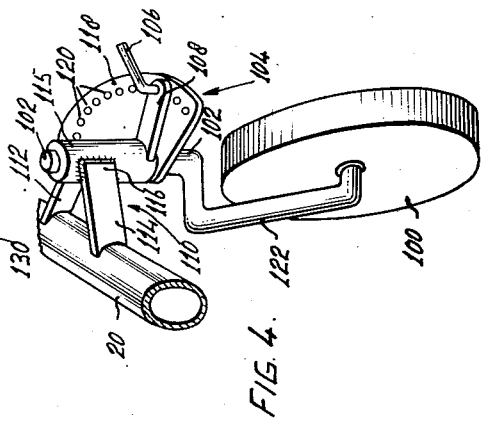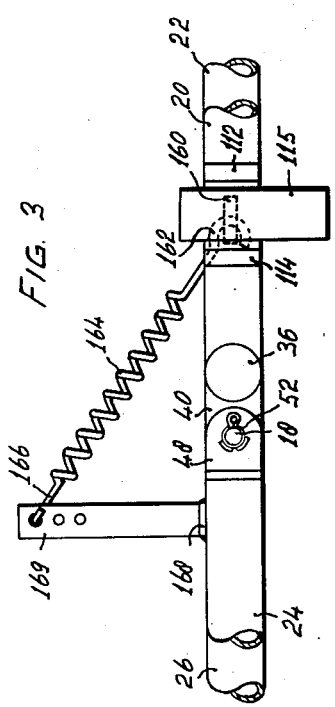

3,004,378
SIDE DELIVERY RAKING DEVICE
Cornelis van der Lely and Ary van der Lely, Maasland, Netherlands, assignors to C. van der Lely N.V., Maasland, Netherlands, a Dutch limited company of the Netherlands
Filed Sept. 30, 1957, Ser. No. 687,027
Claims priority, application Netherlands Nov. 30, 1956
5 Claims. (Cl. 56—377)

This invention relates to devices for laterally displacing or turning crop or the like material lying on the ground. More particularly, the invention relates to devices of the kind which comprise a frame suitable for carrying a plurality of rake wheels, the frame comprising two portions which are so connected as to be removable relative to one another about a substantially horizontal axis, with the frame being supported by at least one adjustable ground wheel.

Known devices to which the present invention relates are usually of a great length, and these devices may comprise two parts which are connected together so as to be movable relative to one another in a vertical direction, by permitting the device to adapt itself to uneven ground. Under certain conditions, a device of the kind set forth may have the disadvantage that the ground wheels are non-adjustable about vertical axes, and are arranged at the rear of the device, so that the device can be controlled only with difficulty when cornering, during which time the raking effect may not be satisfactory. Moreover, the lateral forces exerted on such a device can be opposed only with difficulty so that the device tends to move to one side during its forward movement, thus adversely affecting the raking action of the device.

It is therefore an object of the present invention to obviate these disadvantages by providing an adjustable ground wheel which is connected to the frame at or near the connection between the two portions of the frame.

Another object of the present invention is to provide an adjustable ground wheel which is located on or near the line of resistance of the device, so that when the device is in operation, the wheel is, or is adapted to be, rigidly secured to the frame whereby to be immovable about a vertical axis. When the ground wheel is connected at or near the two portions of the frame, the lateral forces exerted on the device during operation, can be readily opposed by the ground wheel which is located on or near the line of resistance of the device, so that lateral slip of the device is substantially prevented. Moreover, when cornering with the device, the rake wheels will perform satisfactorily.

The two portions of the frame are preferably linked together by a horizontal pivot pin, and a draw-bar (on which the tractive force required to move the device can be exerted) and the ground wheel are preferably secured to the same portion of the frame. The draw bar is secured to the front (relative to the intended direction of travel of the device) of the frame so that the tractive force is applied to a point which lies at a small distance from the line of resistance, this distance being preferably smaller than the diameter of a rake wheel. In order to increase the resistance to lateral slip, it is preferable to transfer at least part of the weight of one frame portion to the other frame portion in a resilient manner; the draw-bar and the ground wheel are connected to the other frame portion so that the load on the ground wheel is increased. In order to vary the working width of the device, the one frame portion is arranged so as to be tilted upwards relative to the other frame portion, so that the rake wheels associated with the one frame portion are raised out of contact with the ground and hence removed from operation.

Preferably, each frame portion comprises two tubular or bar members which extend substantially horizontally, and each frame portion is supported at least in part, by a respective ground wheel, so that each section is capable of adapting or accommodating itself to the unevenness of the ground.

The frame portions of the device are preferably situated at the height of the hubs of the rake wheels behind the rake wheels as viewed in the direction of travel of the device. The frame of the device lies in a substantially horizontal plane so that a favourable load on all of the parts are ensured, when the frame lies at substantially the same height as the hubs of the rake wheels.

It is further preferable that the one or foremost frame portion be provided with running or ground wheels and constitute an independent raking device after disconnection of the other frame portion.

For a better understanding of the invention, and to show how the same may be carried into effect, reference will now be made to the accompanying drawings, in which:

FIG. 2 is a fragmentary side view of the device shown in FIG. 1; and

FIG. 3 is an enlarged side view of a portion of FIG. 1 looking the direction III—III; and, FIG. 4 is an enlarged perspective view of the locking device for locking the adjustable ground wheel to prevent revolving thereof.

Figure 1:
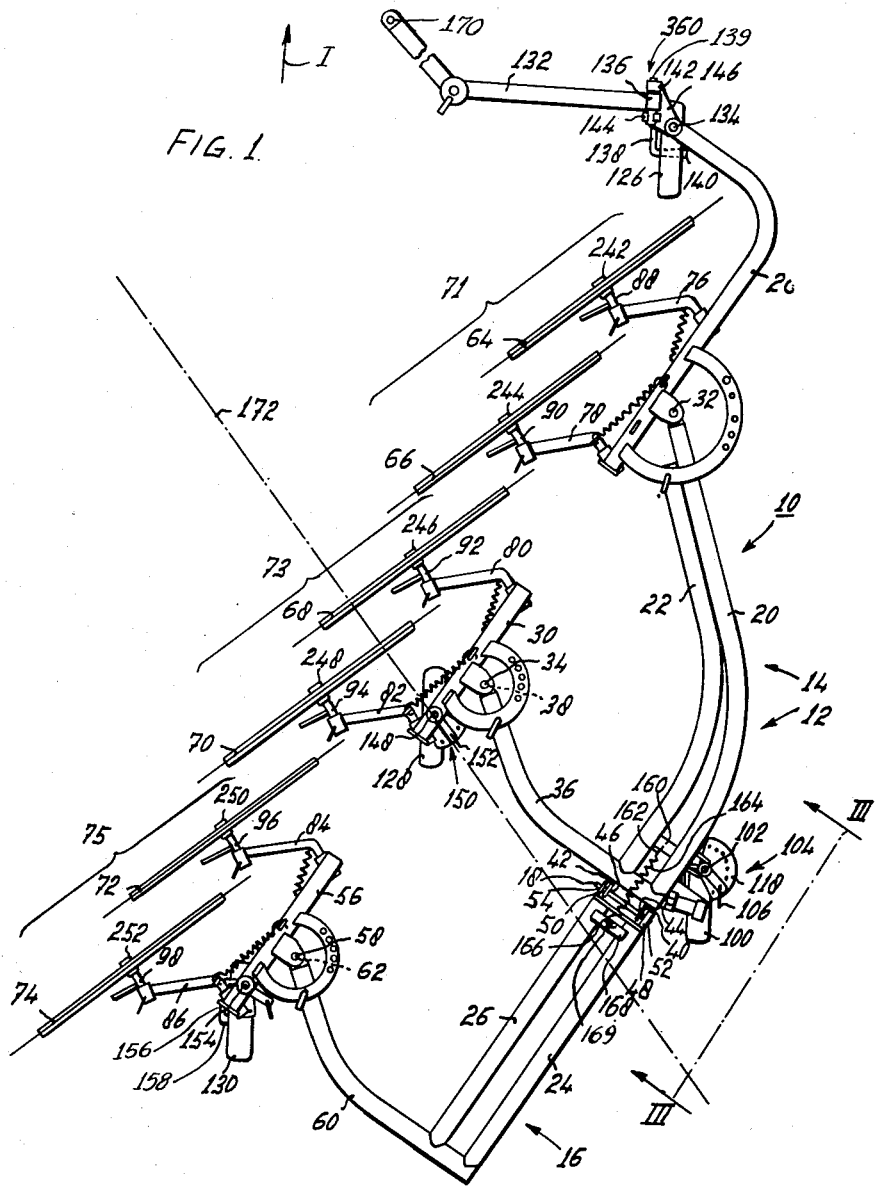
FIG. 1 is a plan view of a device, including an adjustable ground wheel, for laterally displacing material lying on the ground.

Referring now to FIGS. 1 and 2 of the drawings, the device 10 comprises a frame 12 comprising two frame positions 14 and 16 which are articulated to one another by means of a horizontal bar or axle 18. Frame portion 14 comprises two tubular or bar members 20 and 22; and, frame portion 16 also comprises two tubular or bar members 24 and 26. The frame portion 14 carries two support members 28 and 30, which are secured to the frame portion 14 by means of vertical pivot pins 32 and 34. Pivot pin 32 couples support member 28 to one end of bar member 20; one end of bar member 22 being coupled to bar member 20 near pivot pin 32.

Frame portion 14 also includes an arm 36 having a journal 38 at one end capable of receiving and journalling pivot pin 34. The other end of arm 36 is fixedly connected by any well known method, such as by welding or brazing, to bar members 20 and 22 at the other ends thereof. Coupled to the other end of arm 36 and in alignment with bar member 20 is a stud or plate member 40; also coupled to the other end of arm 36 and in alignment with bar member 22 is another stud or plate member 42. Plate members 40 and 42 are provided with openings 44 and 46, respectively for receiving the horizontal bar or axle 18 and for rotation relative thereto.

Bar members 24 and 26 are also provided at one end thereof with stud or plate members 48 and 50, respectively; plate members 48 and 50 may also be provided with openings 52 and 54 which are in axial alignment with openings 40 and 42, respectively, and which also receive the horizontal bar or axle 18. Horizontal bar or axle 18 may be fixedly coupled to plate members 48 and 50 and plate members 40 and 42 may be freely rotatable about axle 18, or vice versa; also, plate members 40, 42 and 48, 50 may be freely rotatable about axle 18 with the ends thereof enlarged by any well known method so as to prevent inadvertent disengagement.

Frame portion 16 carries a support member 56 by means of a vertical pivot pin 58. Frame portion 16 also includes an arm 60 having a journal 62 at one end capable of receiving and journalling pivot pin 58. The other end of arm 60 is fixedly coupled, such as by welding or brazing to bar members 24 and 26 at the other ends thereof.

A plurality of rake wheels 64, 66, 68, 70, 72 and 74 are carried by the device 10. Each support member 28, 30 and 56 carry a pair of the rake wheels 64, 66, 68, 70, and 72, 74, respectively. It is to be understood that although each support member is shown as carrying only a pair of two rake whels 71, 73 and 75, more than two rake wheels may be carried by each support member.

Each support member 28, 30 and 56 carries two or a pair of cranks 76, 78, 80, 82, and 84, 86, respectively which are coupled at one end to their respective support members 28, 30, and 56. The other ends of each of the cranks 76, 78, 80, 82, 84 and 86 are coupled to one end of shafts 88, 90, 92, 94, 96 and 98, respectively. The other end of each of the shafts 88, 90, 92, 94, 96 and 98 have the rake wheels 64, 66, 68, 70, 72 and 74 respectively journalled thereto for rotation relative thereto.

Referring now to FIGS. 1 to 3, it will be seen that near the connection of the frame portion 14 with the frame portion 16, there is mounted a ground wheel 100 which is connected to the bar member 20 of the frame portion 14, by means of a vertical pin 102. The ground wheel 100 is, however, locked in position by means of a locking device 104, which includes a locking pin 106, which extends through bar member 108 mounted on journal 115.

A U-shaped member 110 having each leg 112 and 114 coupled to bar member 20 is provided for supporting vertical pin 102 in a journal 115 provided at the base 116 of the U-shaped member. A plate-like member 118 having a plurality of apertures 120 therein capable of receiving the locking pin 106 is provided for supporting ground wheel 100 relative to frame portion 14. A ground wheel support member 122 is provided having at one end thereof an axle 124 about which ground wheel 100 revolves from a first predetermined position to a second predetermined position, the other end of member 122 is coupled to plate-like member 118 and rotates therewith. Plate-like member 118 and support member 122 rotate about and are connected to vertical pin 102 and are effective for revolving thereabout the ground wheel 100. Locking pin 106 is effective for locking plate-like member 118 so as to prevent the revolving thereof and maintain the ground wheel 100 in one of its predetermined positions. Locking pin 106 together with the apertures 120 in plate-like member 118 are effective for positioning the wheel 100 in a number of predetermined positions.

Accordingly, the ground wheel 100 can have the plane prevented from rotating about the pin 102, and the ground wheel 100 constitutes a wheel determining the direction of travel of the device and is capable of resisting at least part of the forces exerted laterally on the device.

The frame 12 of the device 10 is furthermore supported by three additional ground wheels, which are connected to the supports 28, 30 and 56 respectively. The support member 28 is extended in a horizontal frame around and in front of the rake wheel 64, and a draw-bar 132, on which the tractive force can be exerted, is connected to the free end of the support member 28. The draw-bar 132 is connected to the ground wheel 126 so as to be rotatable, together with the revolving of wheel 126, about a vertical pivot pin 134 relative to the support member 28, so that the ground wheel 126 constitutes a steering wheel for the device.

One end of draw-bar 132 has a coupling 360 provided with an opening 136 for receiving an axle 139 which is also received within bushings 142 and 144 coupled to a flange extension 146. Flange extension 146 is coupled at its other end to a pivot pin 134 for rotation thereabout. A support member 138 having at one end thereof an axle 140 about which ground wheel 126 rotates and its other end forming part of the pivot pin 134 about which wheel 126 revolves is provided for supporting ground wheel 126 relative to the draw-bar 132. Member 138 is translatably fixed by means of flange 146 relative to draw-bar 132; the member 138 is also rotatable relative to draw-bar 132 about the pivot pin 134; the pivot pin 134 also is received in support member 28 whereby the draw-bar 132 is rotatable about pivot pin 134 relative to the support member 28 and the ground wheel 126 is revolvable relative to the support member 28 about the vertical pivot pin 134.

The ground wheel 128, which is connected to the support member 30, is rotatable about a vertical pivot pin 148, there being a locking device 150, including a locking pin 152, for securing the ground wheel 128 in position relative to the support member 30. The ground wheel 130, which supports, at least partly, the frame portion 16, is rotatable about a vertical pivot pin 154, the ground wheel 130 being adapted to operate as a caster wheel.

Locking device 150 is generally similar to locking device 104, and it is to be understood that it comprises the same parts. With locking device 150, the pivot pin 152 is coupled and journalled directly to support member 30, although it is within the scope of this invention to have the same coupling as locking device 104 by means of a U-shaped member (not shown) similar to U-shaped member 110.

For wheel 130, which acts as a caster wheel, there is provided a wheel support member 156 having one end coupled to pivot pin 154, and the other end provided with an axle 158 for supporting ground wheel 130. Wheel 130 rotates about axle 158 in any predetermined plane, and the wheel 130 rotates about pivot pin 154.

Coupled between bar members 20 and 22 near the other ends thereof, at which arm 36 is connected, is a plate 160 for holding one end 162 of a spring 164. The other end 166 of spring 164 is coupled to a tag or plate 168. Tag or plate 168 is coupled between tubular or bar members 24 and 26 at one end thereof. Plate 160 is connected between bar members 20 and 22 so that when connected thereto the one end of the spring 162 is at the same level as the members 20 and 22; the tag or plate 168 is connected on top, as considered in FIG. 1, of bar or tubular members 24 and 26 so that the other end 168 of the spring 164 is disposed at a level which is higher than the level of the tubular or bar members 24 and 26. Tag or plate 168 has a free end 169 which is higher than members 24 and 26, and end 166 of spring 164 is connected to the free end 169.

It will be understood by those skilled in the art that the draw-bar 132 is capable of being coupled to a conventional tractor (not shown) by means of any suitable connector at point 170 which may be considered the traction or drawing point.

In the operation of the device 10, it is moved forward in the direction of the arrow I as shown in FIG. 1 and the rake wheels 64, 66, 68, 70, 72 and 74 will engage the crop and laterally displace the same to the left. The crop located in front of the rake wheels will exert forces on the device, the resultant of which forces will act along the line of resistance 172. For structural reasons, and in order not to have parts of the frame engaging the crop in front of the rake wheels, the draw-bar 132 is disposed at the front end of the device in such a way that the traction point 170 lies at a substantial distance from the line of resistance 172. The force exerted by the crop along the line of resistance 172 will then produce a torque or moment about the point 170; and, in order to oppose the torque or moment in an advantageous manner, the ground wheels 100 and 128 are located on or near the line of resistance 172, and near the centre of gravity of the device. Were the ground wheels 100 and 128 not so disposed, then the device 10 as a whole could be rather easily moved to one side in operation, which is not desirable.

In order to increase resistance to the lateral displacement of the device 10 as a whole, it is advantageous to transfer at least part of the weight of the frame portion 16 to the frame portion 14, so that the ground wheels 100 and 128 are loaded more heavily. In order to achieve this, the spring 164 is connected to the frame portion 14 at a point 162 which lies on the same level as the tubular members 20, 22 which constitute the frame portion 14. The other end 166 of the spring 164 is connected to the frame portion 16 at the free end 169 of the tag or plate 168, the end 169 being disposed at a higher level than the tubes 24 and 26 which constitute the frame portion 16. The spring 164 serves to transfer in a resilient manner at least part of the weight of the frame portion 16 to the frame portion 14. That part of the weight of the frame portion 16 which is transferred to the frame portion 14 may be varied by altering the tension of the spring 164; for example, by connecting one end of the spring 164 to a fastening member (not shown) which is connected to one of the frame portions and which is displaceable relative to such frame portion. In order to ensure satisfactory adaptation and accommodation of the frame portion 16 to any unevenness of the ground, at least part of the weight of the frame portion 16 should act on the ground wheel 130.

It is to be noted that bar member 108 is fixedly coupled to bushing 115, and plate-like member 118 is journalled to journal 115 and supported for rotation therein about vertical pin 102.

Each rake wheel 64, 66, 68, 70, 72 and 74 is provided with a hub 242, 244, 246, 248, 250 and 252, respectively which couples the rake wheels to their respective cranks. The hubs are on the same level as the frame portions 14 and 16 so that the tractive force exerted by draw-bar 132 is distributed to all of the rake wheels.

Since many widely different embodiments of the invention may be made without departing from the spirit and scope thereof, it is to be understood that the invention is not limited to the specific embodiments disclosed.

What we claim is:
1. A side delivery rake for the lateral displacement of crop lying on the ground, comprising a frame, a row of rake wheels, means supporting the rake wheels on said frame in operative association for side delivery operation, said means including support members pivotally connected to said frame, said support members supporting the rake wheels in a row for said side delivery operation, a first ground wheel connected to said frame at one end of said row of rake wheels, a second ground wheel connected to said frame at the other end of said row of rake wheels, a third ground wheel pivoted on said frame behind said row of rake wheels intermediate said first and second ground wheels, and means to fix said third wheel against pivotal movement.

2. A device as claimed in claim 1 wherein said frame comprises tubular members and arms extending from said tubular members, said support members being pivotally connected to said arms, said ground wheels being connected to said support members.

3. A device as claimed in claim 1 wherein said frame comprises a first and a second frame portion and means connecting said portions for relative movement about a substantially horizontal axis, and spring means connected between said two frame portions for transmitting at least part of the weight of said first frame portion to said second frame portion, said third ground wheel being mounted on said second frame portion.

4. A device as claimed in claim 1 wherein said first ground wheel is supported by one of said support members and said one support member extends partially around a rake wheel supported by said one support member.

5. A device as claimed in claim 1 comprising a draw bar connected to said first ground wheel, said draw bar and said first ground wheel being pivotally mounted on one of said support members.

References Cited in the file of this patent

UNITED STATES PATENTS

| | | |
|---|---|---|
| 1,811,798 | Lucke | June 23, 1931 |
| 1,853,817 | Jordan | Apr. 12, 1932 |
| 2,441,430 | McCullar | May 11, 1948 |
| 2,445,865 | Sleeper | July 27, 1948 |
| 2,572,589 | Bishop | Oct. 23, 1951 |
| 2,602,684 | Pinke | July 8, 1952 |
| 2,689,446 | Sorrels | Sept. 21, 1954 |
| 2,750,726 | Boucard et al. | June 19, 1956 |

FOREIGN PATENTS

| | | |
|---|---|---|
| 1,081,746 | France | June 9, 1954 |
| 1,095,043 | France | Dec. 15, 1954 |
| 1,127,200 | France | Aug. 6, 1956 |